(No Model.) 9 Sheets—Sheet 1.
W. P. QUENTELL.
TYPE WRITING MACHINE.
No. 556,863. Patented Mar. 24, 1896.
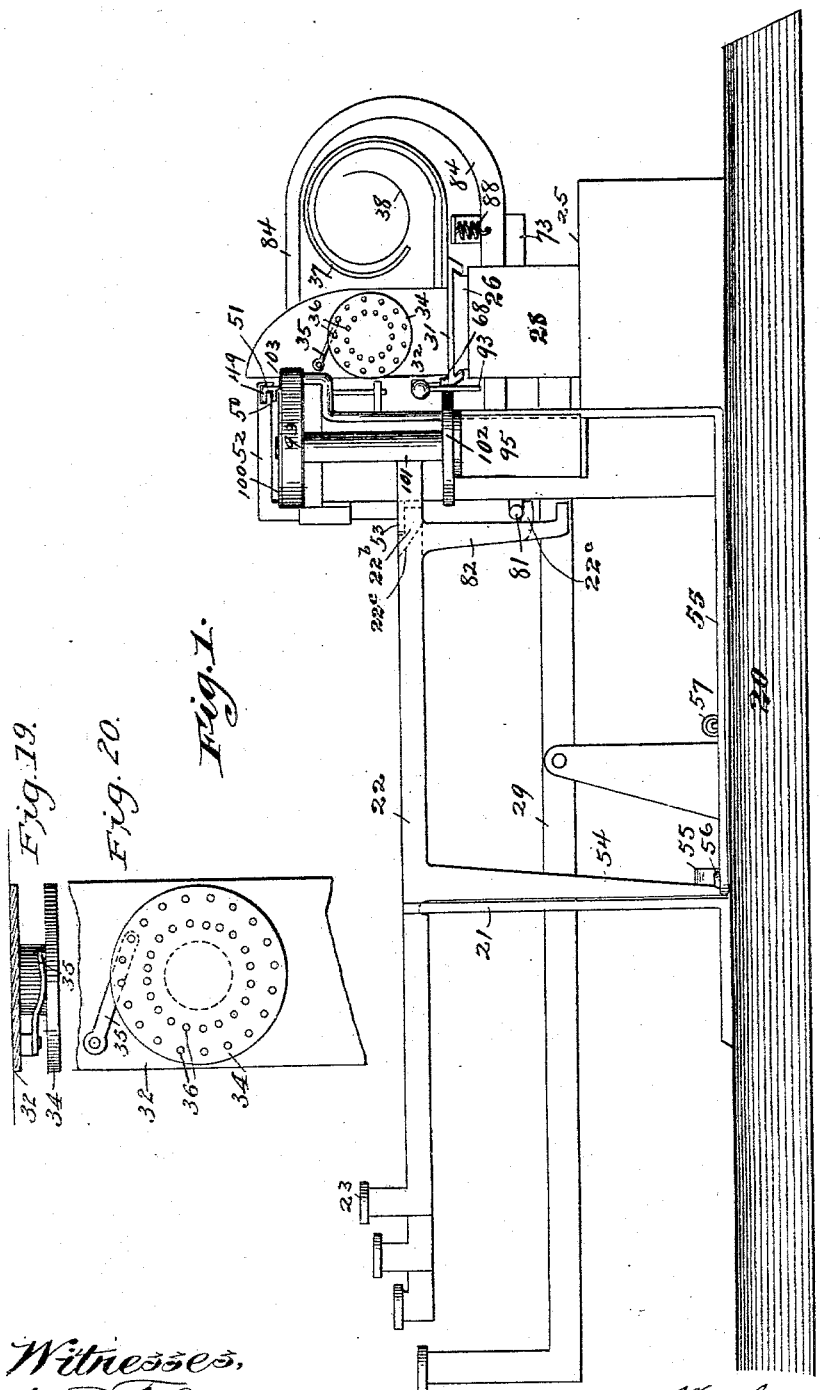
Witnesses.
Inventor:
William P. Quentell
by Offield, Towle & Linthicum
Attys.

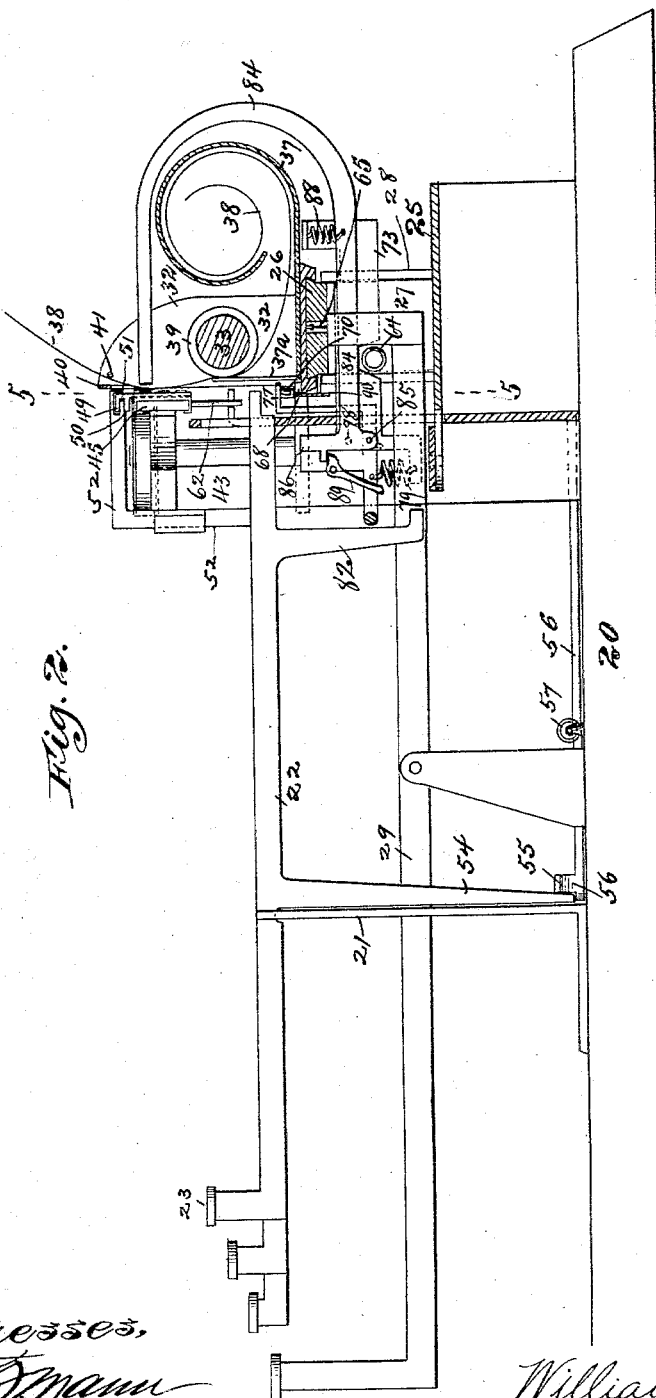

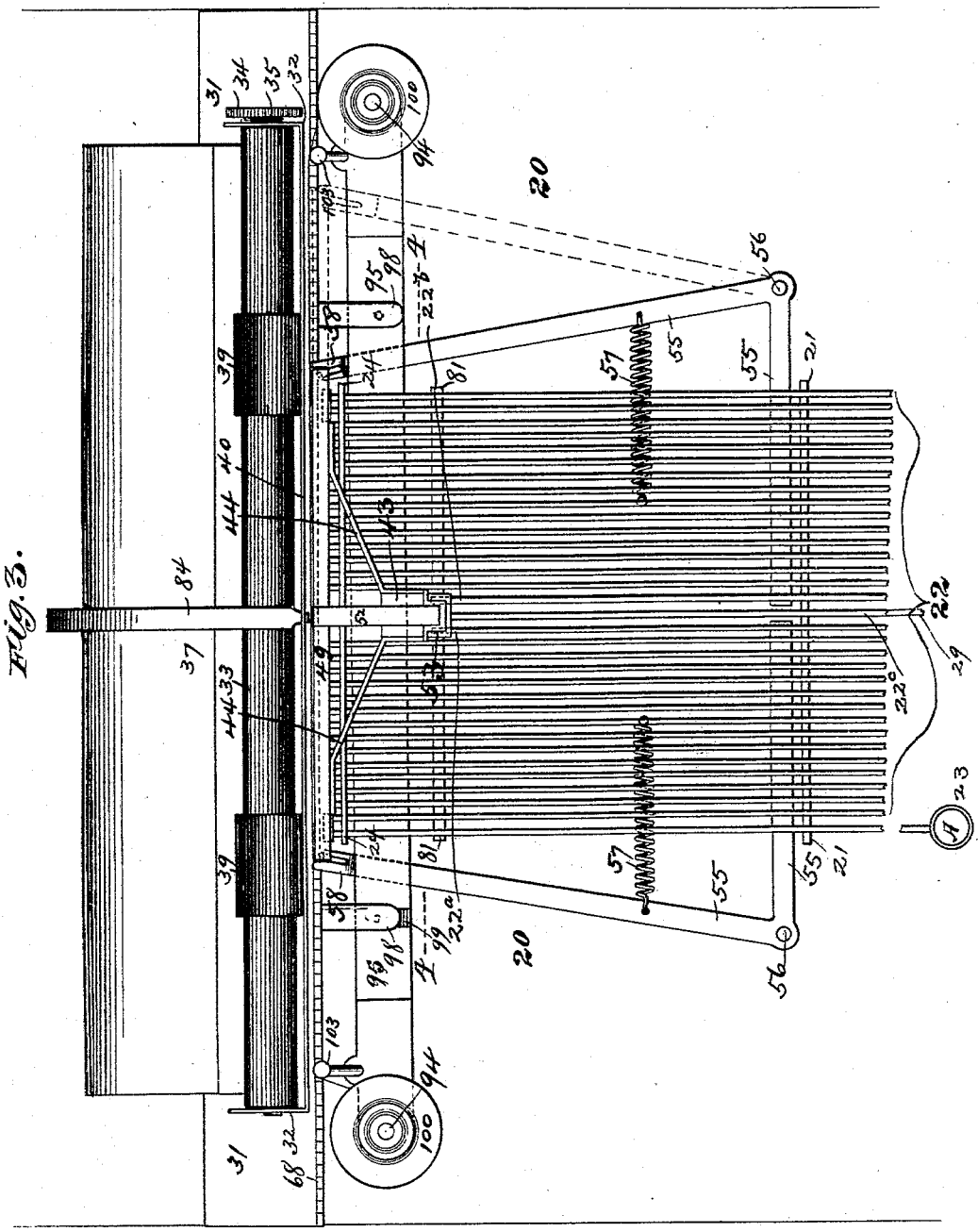

(No Model.) 9 Sheets—Sheet 4.
W. P. QUENTELL.
TYPE WRITING MACHINE.
No. 556,863. Patented Mar. 24, 1896.
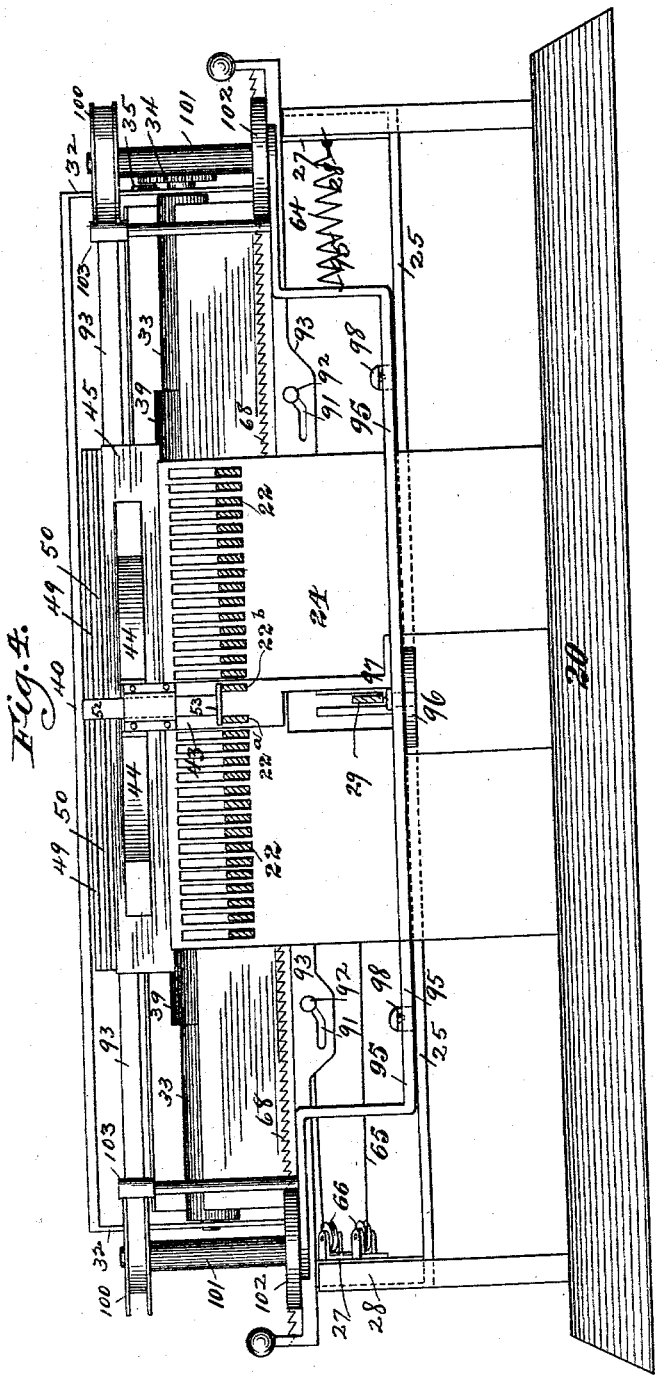
Witnesses,
D. Mann,
F. C. Goodwin
Inventor,
William P. Quentell
By Offield Towle & Linthicum
Attys.

(No Model.) 9 Sheets—Sheet 5.
W. P. QUENTELL.
TYPE WRITING MACHINE.
No. 556,863. Patented Mar. 24, 1896.
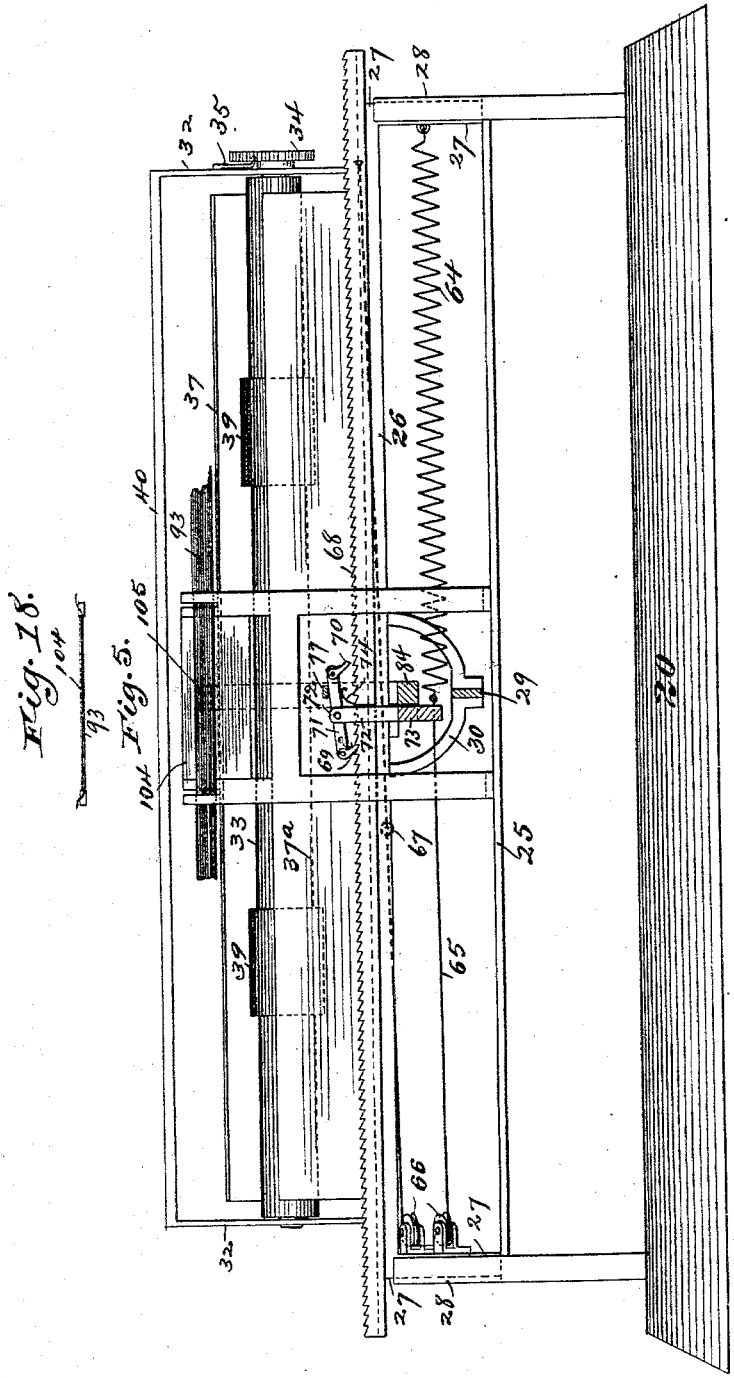
Witnesses,
J. C. Goodwin
L. B. Mann
Inventor,
William P. Quentell
By Offield, Towle & Linthicum
Attys.

(No Model.)
9 Sheets—Sheet 6.
W. P. QUENTELL.
TYPE WRITING MACHINE.
No. 556,863. Patented Mar. 24, 1896.
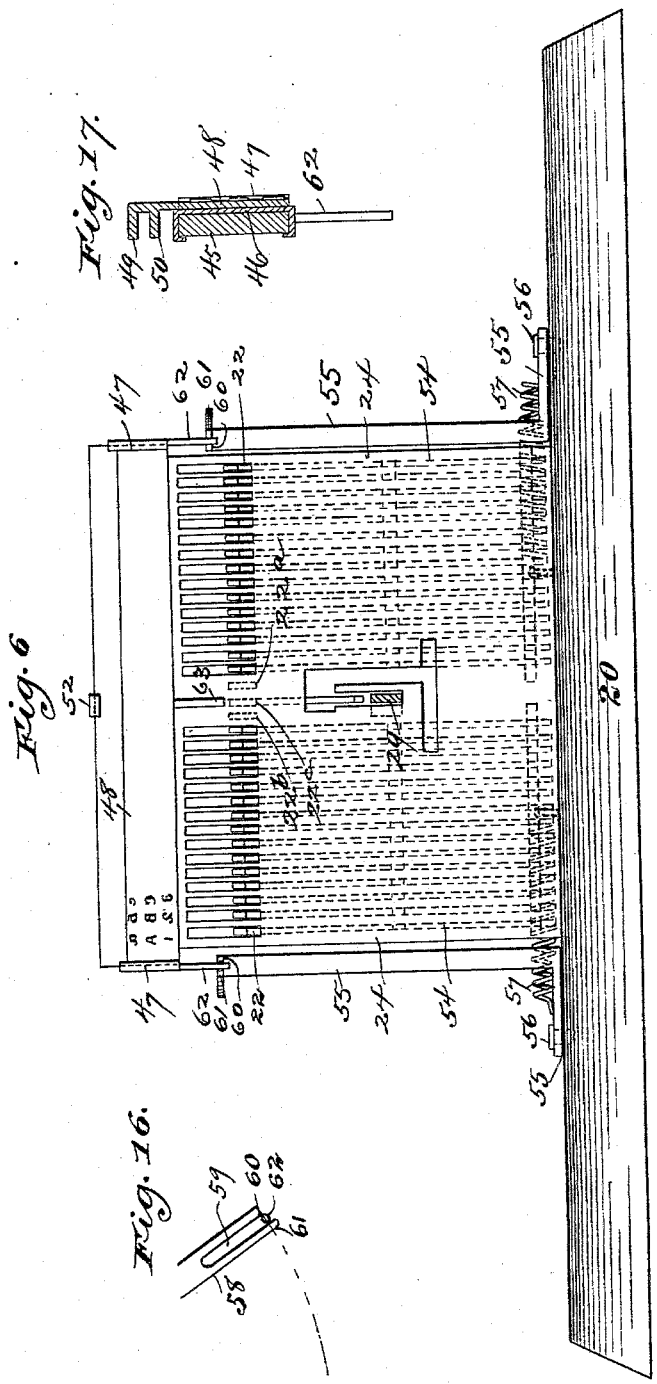
Witnesses,
Inventor,
William P. Quentell
By Offield Towle Linthicum
Attys (No Model.) 9 Sheets—Sheet 7.
W. P. QUENTELL.
TYPE WRITING MACHINE.
No. 556,863. Patented Mar. 24, 1896.
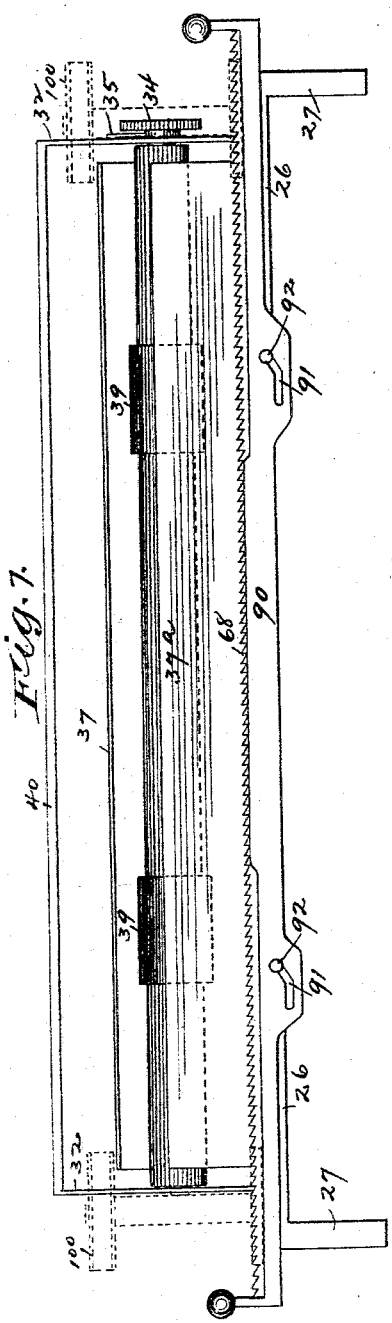
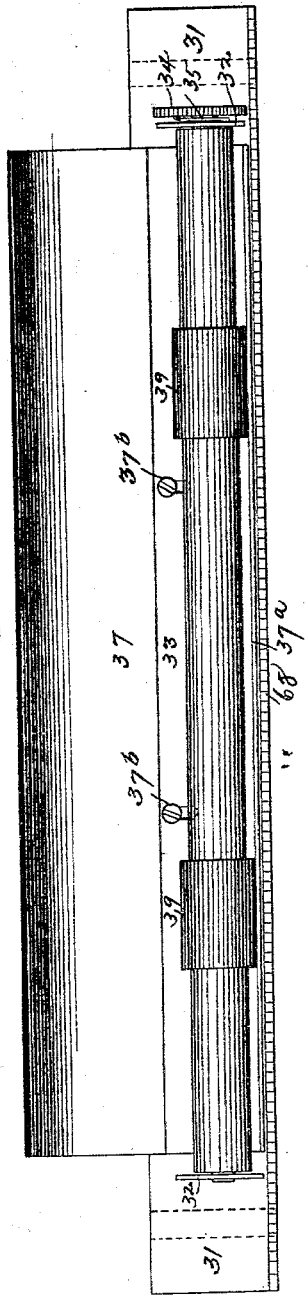
Witnesses:
Inventor;
William P. Quentell
By Offield Towle & Linthicum
Attys.

(No Model.) 9 Sheets—Sheet 8.

W. P. QUENTELL.
TYPE WRITING MACHINE.

No. 556,863. Patented Mar. 24, 1896.

Witnesses,
J. J. Mann
F. C. Goodwin

Inventor,
William P. Quentell
By Offield, Towle & Linthicum
Attys.

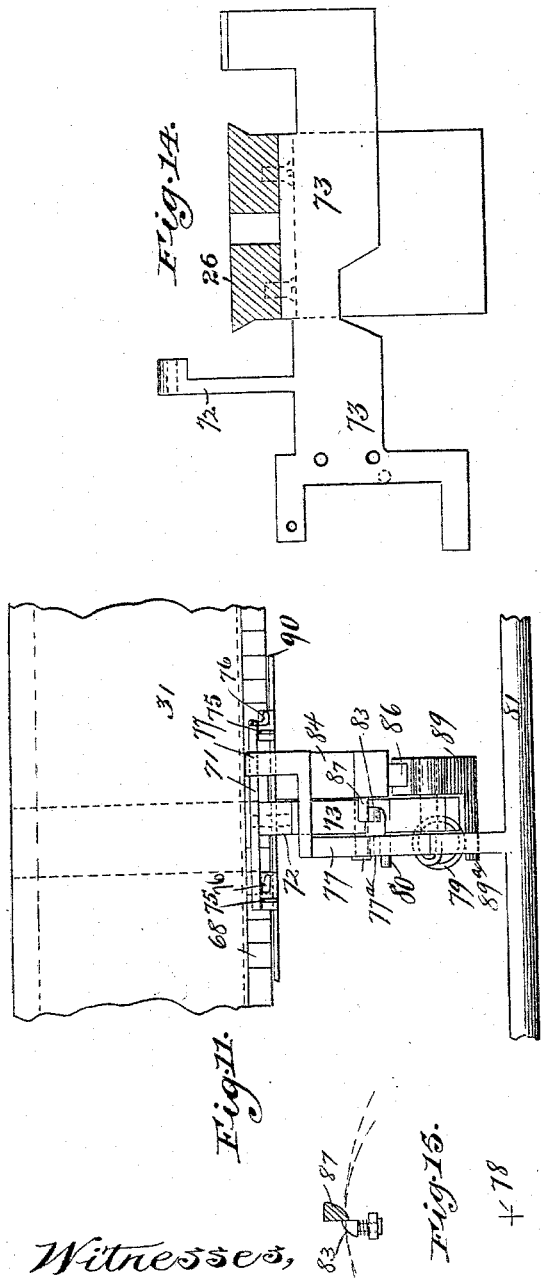

UNITED STATES PATENT OFFICE.

WILLIAM P. QUENTELL, OF KANSAS CITY, MISSOURI.

TYPE-WRITING MACHINE.

SPECIFICATION forming part of Letters Patent No. 556,863, dated March 24, 1896.

Application filed March 30, 1895. Serial No. 543,883. (No model.)

*To all whom it may concern:*

Be it known that I, WILLIAM P. QUENTELL, of Kansas City, Missouri, have invented certain new and useful Improvements in Type-Writing Machines, of which the following is a specification.

This invention relates to type-writing machines, and the object of the invention is to produce a type-writer compact in form and of such construction that it can be sold at low price. In the preferred construction I employ a series of pivoted keys, which are arranged to act as levers of the first order, a movable type-bar or printing-plate, which is shifted to bring any character secured to the face thereof into printing position, a sliding paper-carriage, an ink-ribbon, and a pivoted hammer, which is actuated to force the paper against the type to produce the impression. I also employ mechanism whereby the type-bar or printing-plate is moved vertically to bring upper or lower case characters into the printing position, and means whereby the paper-carriage and parts connected therewith may be raised bodily to expose the printed line to view.

The invention consists in the novel devices and combinations of devices hereinafter described and particularly pointed out in the claims.

Figure 9:
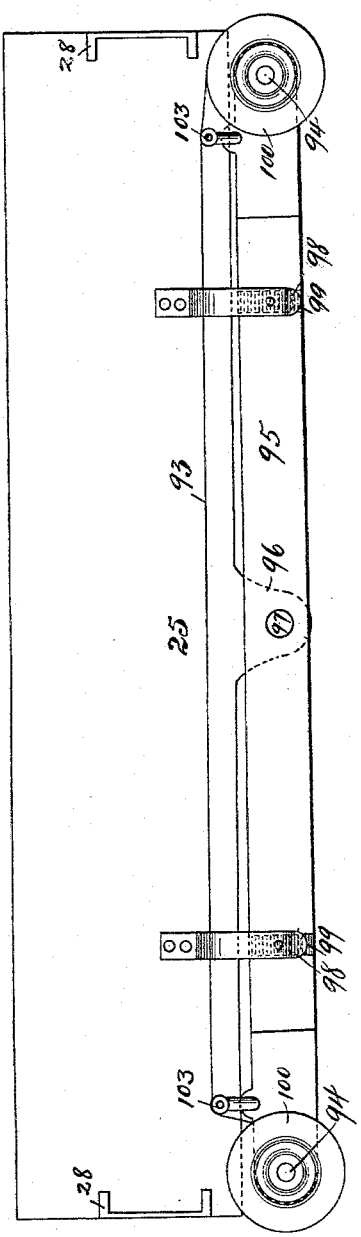
Figure 10:
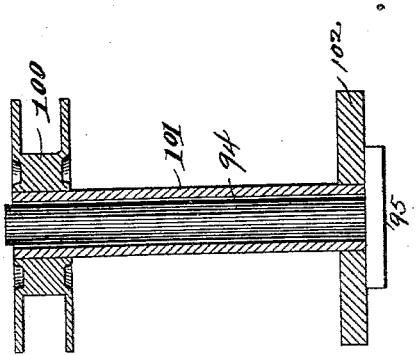

In the accompanying drawings, Figure 1 is a side elevation. Fig. 2 is an elevation partly in section, the section being taken transversely through the carriage. Fig. 3 is a plan view with the outer ends of the key-levers broken away and parts omitted. Fig. 4 is a sectional elevation taken on the line 4 4 of Fig. 3, looking toward the paper-carriage. Fig. 5 is a similar view taken on the line 5 5 of Fig. 2, parts being omitted. Fig. 6 is a section taken on the same line, but looking in the opposite direction. Figs. 7 and 8 are respectively an elevation and a plan view showing the carriage and its support, Fig. 7 showing also in dotted lines the ribbon-spools and in full lines a bar for disengaging the feed-dog and for lifting the ribbon-spools in order to shift the carriage by hand. Fig. 9 is a detail view in plan of the ribbon-spools and their supports and a part of the means for rotating them. Fig. 10 is a detail of the ribbon-spool in section. Figs. 11, 12, and 13 are detail views of a ratchet mechanism for the paper-carriage, and showing the parts for operating the ratchet. Fig. 14 is a detail showing, in side elevation, a supporting-bracket and a cross-section through the paper-carriage bed. Figs. 15 to 20 are detail views of various parts.

In the drawings, 20 represents the base.

21 represents an upright bracket or support which forms the fulcrum for a series of key-levers 22. These key-levers are employed to actuate the printing devices and are provided with upwardly-turned outer ends surmounted by buttons 23 marked with characters appropriately corresponding with the characters that are to be imprinted. At their forward ends the series of levers 22 project through vertical slots in a plate 24, also mounted on the base and parallel to the bracket-plate 21.

25 represents a shelf extending transversely across the end of the base 20 farthest from the operator's position, and upon this shelf is adjustably mounted a bed-plate 26, which supports the sliding carriage. This bed-plate has at its ends the pendent legs 27, which work in guides 28 on the shelf 25. The purpose of this construction is to adapt the bed-plate with the paper-carriage mounted thereon to be lifted vertically in order to bring the last line printed on the paper into view above the printing mechanism, and for this purpose a pivoted lever 29 has an upturned end with bifurcations 30, (shown in Fig. 5,) which impinge the lower side of the bed-plate 26, so as to adapt it to be carried up when the lever 29 is rocked on its pivot.

The paper-carriage is composed of the base 31, having brackets 32 at its ends, in which is journaled the paper-roll 33, said roll being provided at one end with the milled head 34, by which it is conveniently turned step by step to feed the paper forward as each line is imprinted. The roller is held after each actuation by a spring-pawl 35, which will enter apertures, as 36, in the milled head. These apertures are arranged in circular series, the series being concentric to each other, and by swinging the spring-pawl on its pivot, so as to adapt its engaging end to enter the apertures of one series or the other, the paper will be advanced a full space or a half-space, as desired. The movement of the spring-pawl from one aperture to another in the same series is automatic; but from one series to another it is moved by hand.

37 represents a shield or guard for the paper, a sheet of which is indicated at 38. The paper will be loosely rolled and inserted within the curved portion of the guard and then the edge drawn forward between the paper-roll 33 and a vertical upstanding member 37$^a$ of the guard-plate. The feed-roll 35 is provided with cylindric sections or short sleeves 38 39 of rubber, which serve as friction-rolls to impinge the paper tightly against the vertical plate 37$^a$ and thereby to advance it by the frictional contact. The plate 37$^a$ can be adjusted as to proximity to the roll by means of the set-screws 37$^b$, working in slots in the plate. In order to guide the upper end of the sheet of paper, the bar 40 and rod 41 extend between the brackets 32, and the paper passes up between them.

In order to support the shiftable type-bar or printing-plate, a vertical post 43 is erected upon the base and has projecting forwardly therefrom the supporting-arms 44, to the extremities of which is secured a bar 45. This bar supports a sliding bed 46, which is constructed to embrace the upper and lower edges of the bar 45 and is provided on its face near its ends with retaining-flanges or guide-strips 47, within which is supported, so as to be vertically adjustable therein, the movable type-bar or printing-plate 48. On the rear face of said printing-plate 48 are the ribs 49 50, projecting at right angles to the plane of the plate and slightly separated, so as to adapt them to receive a furcation 51 of an elbow-lever 52, which lever has a sliding bearing in the post 43, and the lower end of said post terminates in a foot 53, which normally rests upon the inner ends of two key-levers 22$^a$ and 22$^b$. These key-levers are so pivoted that when depressed they raise the elbow-lever, and by means thereof the type-bar or printing-plate. One of the levers has a longer throw than the other, so as to lift the printing-plate to a greater distance.

By reference to Fig. 6 it will be seen that the lower-case letters are arranged in a horizontal line at the top of the printing-plate, the capitals in a line below them, and the figures or other characters, as desired, may be arranged in a line at the lower edge of the printing-plate. The printing-plate will normally be in position to print with the lower-case characters, and if it be desired to imprint a capital the key-lever 22$^a$ will be depressed, thus lifting the printing-plate until the line of capitals will be brought into position vertically opposite the printing-point, and if it be desired to imprint a figure or other character arranged on the printing-plate in the lower line thereof the key-lever 22$^b$ will be depressed, thus lifting the plate until such line is brought into printing position.

In the operation of printing, the printing-plate and its bed are shifted endwise or laterally, and this is effected in a manner which will now be described. The key-levers 22 have the rigid depending arms 54, which are arranged in front of the bracket 21 and with their lower ends in position to actuate bell-crank levers 55. Two of these levers are shown, their pivots being indicated at 56, and these bell-cranks face each other, an arm of each extending toward the center line of the base and transversely thereof. Said arms are normally held in contact with the lower ends of the depending arms 54 by means of the springs 57. The inwardly-extending members of the bell-cranks are inclined toward the longitudinal central line of the machine and project forward to a point below the printing-plate, and are then upturned and terminate in the bent extremities 58. Said extremities are notched, as seen at 59, Figs. 6 and 16, to provide projecting fingers 60 61, which are of unequal length, the shorter finger being on the inner side of the extremity of the lever. The sliding bed-plate 46 has the depending pins 62 and a central stop-pin 63. The pins 62 normally stand in a position to be engaged by the fingers 60 when the bell-cranks 55 are rocked upon their pivots, the pins being normally clear of the slots 59 and fingers 60, and their engagement being possible by reason of the fact that the forwardly-projecting arms of the bell-cranks incline toward the center of the machine, so that when either of said bell-cranks is rocked upon its pivot its extremity describes a circle of such radius that its finger 60 will engage a pin 62, while if the bell-crank on the opposite side of the machine be operated so as to shift the type-bar in the opposite direction the pin 62 at the opposite end will clear the finger 60 of the bell-crank at that side. By reason of this construction the type-bar may be shifted in either direction, depending upon the position on the type-bar of the letter which it is desired to impress. There must be a certain defined relation between the positions of the several type characters and the location of the key-levers with which they correspond, and this relation is that the character nearest the printing-point (which is at the mid-length of the printing-plate) corresponds to the key-lever nearest the middle of the series. There must also be a certain defined relation between the length of stroke of the bell-crank and the position of the key-lever.

Obviously the key-levers which occupy a central position in the series will not swing the bell-crank as far in a given stroke as the key-levers occupying a position at the outside of the series. These being matters of arrangement and proportion, no more specific description need be given but; the arrangement will be such that the key-levers all have an equal stroke or depression. Obviously the depression of one of the key-levers acting through the bell-crank is to move the printing-plate to the right or left, dependent upon whether the key-lever actuated occupies a position to the right or left of the center of the machine.

The stop mechanism is simple. The pin 63 depends in a position to engage the inner end of any one of the key-levers when the latter is actuated, and when this occurs the printing-plate will be arrested with the character corresponding to the key-lever depressed in the printing position by reason of the direct contact of the stop and key-lever.

In the operation of imprinting a character upon the paper it is necessary first to shift the printing-plate so as to bring the character into the printing position. Next, it is necessary to move the paper-carriage one space, and, finally, to make the impression. The movement of the printing-plate has already been described. The feed of the paper-carriage is effected by a spring which is restrained by a ratchet mechanism, and the printing is performed by means of a pivoted hammer, which is actuated by a spring so as to strike the paper and an interposed ribbon against the face of the type. I prefer to actuate the printing-hammer by a spring so that the impression will be uniform, and the mechanism for feeding the carriage and for actuating the printing-hammer will now be described.

The carriage is moved in one direction by means of the extension-spring 64, Fig. 5, having one end made fast to one of the legs 27 and at the other to a cord or cable 65, which is turned over the guiding-sheaves 66 carried by the opposite leg 27, the end of the cable being made fast to the base 31 of the carriage, as clearly shown in Figs. 2 and 5.

It will be seen that the bed-plate 26 on which the carriage moves is slotted and the cord lies in such slot, one of the guiding-sheaves being so disposed as to maintain the cable centrally of the slot. The cable 65 has a stop-button 67, which limits the movement of the carriage under the action of the spring. The carriage-base has a ratchet-bar 68, the teeth of which project upwardly, and these teeth are engaged by pivoted pawls or dogs in order to hold the carriage during the intervals between its movements. These pawls are clearly shown in the details, Figs. 11, 12, and 13, and are marked 69 70, respectively, being pivoted on the extremities of a bar 71, which is carried by a post 72 carried by the bracket 73 secured to the base 26, as shown in Fig. 14. The pivoted bar 71, which carries the dogs 69 70, is normally held by a spring 74 in such position that the dog 70 is out of contact with the ratchet-teeth and the dog 69 normally in engagement therewith. The heels of these dogs have notches for engaging stop-pins 75 in the bar 71, and springs 76 normally tend to hold the dogs in engagement with the ratchet when the bar by which they are carried is in position to permit such engagement.

As shown in Fig. 12, the dog 69 is in engagement and the carriage cannot be moved, and this is the normal position. In order to permit the movement of the carriage, this dog must be released, and this is effected by rocking the bar 71 on its pivot, and this rocking is accomplished by the action of a bent lever 77, which is shown in detail in Figs. 11, 12, and 13. This lever 77 is pivoted at 78 to the bracket 73 and is held in its normal position by means of a spring 79, one end of which is secured to the rear end of the bent lever 77 and the other to an extension of the bracket 73. A stop-pin 80 on the bracket limits the rocking movement under the spring-tension. The bent lever carries at its lower extremity a bar or rod 81, which extends transversely of the machine beneath the forward ends of the series of key-levers and in position to be engaged by integral hooked arms 82, each key-lever 22 being provided with one of these arms. The lever 77 has an upper extension 77$^a$ provided with a spring-latch 83.

As will be seen, particularly in Fig. 12, the upper end of the lever 77 has a bearing on the pivoted bar 71, and whenever the bent arm is rocked on its pivot the pivoted bar 71 will be depressed, thus lifting the pawl 69 out of engagement with the ratchet-bar and bringing the pawl 70 into position to engage a tooth until the bent arm is released, whereupon its spring 79 will return it to the normal position in which the pawl 69 will again be engaged. During this interval the carriage will have advanced one step.

The printing is effected by means of a pivoted hammer 84, the form of which is most clearly shown in Figs. 1 and 2. The hammer is substantially U-shaped and embraces the paper guard or shield, the paper-roll and the sliding carriage. Said hammer is pivoted at 85 on the bracket 73, and it has a straight upturned end 86 carrying a lug 87. The blow of the hammer is caused by a spring 88, one end of which is made fast to a lug on the bracket 73, the other end being made fast to the hammer in front of its pivot. This spring may be kept normally extended so that by its retractile power a quick sharp blow of the hammer will be given. This tension is normally maintained by the coaction of the latch 83, the lug 87, spring 88, and the pivoted dog 89, which is pivoted on the bracket 73, and has a bent end 89$^a$ extending into the path of the bent arm 77, the latter being controlled, as before stated, by the spring 79. The dog 89 has a bearing on the extension 86 of the hammer 84. The operation of these parts is as follows: When one of the key-levers is actuated its hooked arm 82 engages the bar 81. The hooked end of the arm 82 is normally at such distance below the bar 81 that time is allowed for the type-bar or printing-plate to shift to the proper position. When this is attained the arm 77 will have been rocked far enough to release the dog 69 and permit the carriage to move one step. The arm 77 and the hammer 84 move together, carrying the spring-latch 83 in contact with the lug 87 on the hammer, the spring 88 operating to rock the hammer on its pivot, thus delivering the blow which forces the paper and the interposed type-ribbon against the printing-face. As the arm 77 and hammer 84 are pivoted on different centers, the latch 83 and lug 87 separate during the forward movement. The dog 89 may be omitted and the springs 79 and 88 may be of equal strength. This can be accomplished by tensioning spring 88 by the depression of the key, and when the lug and latch disengage the spring will throw the hammer a little past its normal limit, to which it will return after the blow.

In order to permit the carriage to be moved forward, as in correcting, the dogs must be held out of engagement with the teeth of the ratchet-bar. To effect this I employ the sliding plate 90, which has cam-slots 91, through which pins 92 on the bed 26 project. The ends of the plate are upturned, so as to enable them to be conveniently grasped by the operator, and then by shifting the plate endwise in the cam-slots its middle raised portion will contact with the lower ends of the dogs 69 and 70, which overhang or project beyond the ratchet-teeth, as clearly shown in Fig. 13. As the sliding plate raises and lifts the dogs clear of the ratchet-teeth, the carriage can then be moved backward or forward, the pins reaching the ends of the slots during the movement.

When the carriage is to be operated in printing, the plate is returned to its normal position and the dog 69 will engage the ratchet.

The ribbon and its carrying mechanism is best shown in Figs. 3, 4, 9, and 10. The ribbon is marked 93, and it is connected to two spools, so that it will be wound and unwound on said spools respectively and alternately during the operation of writing. An enlarged detail of one of said spools is shown in Fig. 10. The spools are mounted upon spindles 94, which are carried by the upturned ends of a rocking bar 95, the latter being pivoted to a lug 96 extending from the bed 26, and the pivot being indicated at 97. The rocking bar 95 is held in a set position by means of the leaf-springs 98, having pins or engaging-points which work upon roughened surfaces 99 on the upper face of the bar 95. The spool 100 is mounted on a sleeve 101, which is rotatably mounted on the spindle 94, and the sleeve carries at its lower end a driving friction-disk 102, which may be thrown into contact with the side of the ratchet-bar on the sliding carriage by rocking the bar 95 on its pivot. The throwing of one of the disks into contact with the sliding carriage will free the disk of the spool at the opposite side from said contact, and as the carriage advances it will cause the spool which is in gear with it through its disk to be rotated as the carriage advances. This rotation of the spool will wind the ribbon thereon and unwind it from the other spool, and when the ribbon has wound from one spool to the other the rocking bar or plate will be shifted so as to put the other disk in gear with the driving-carriage, and the ribbon will be wound upon the other spool. In order to feed the ribbon in a plane parallel to the face of the type the guides 103 are employed.

A suitable space-key 22° is employed, the position of the same being central and terminating at the post 43, as it is not connected with the type-bar or printing-plate, and it is arranged so as to lift the retaining-dog 69 without actuating the hammer by so pivoting it that its stroke will be shorter than that of the key-levers 22.

In order to prevent the ribbon from blurring the face of the paper, I interpose a thin guard-plate 104, Fig. 5, having an aperture 105, as shown by the dotted lines in said figure, at a point opposite the end of the hammer when delivering the blow, so that only that portion of the paper contacts with the ribbon as is exposed to the aperture.

Obviously some of the features of construction which have been described may be omitted from a machine containing others of said features, and the details of construction of the several parts may be modified.

I am aware that it has been proposed to employ a shiftable type-bar or printing-plate, and to connect the same so that it may be operated by the movement of the key-levers. I am also aware that it has been proposed to mount the type on a curved segmental plate and rock said plate in order to bring the type carried thereon into printing position. I am also aware that the particular form of hammer is not novel.

So far as I am aware no one has proposed heretofore to operate the printing-plate by a single pivot-lever interposed between the key-lever and such plate, and so far as I am aware no one has heretofore provided the printing-plate with a central stop engaging the key-lever directly.

There are other features of my improved type-writer which are new in their construction as well as in the various combinations of the several elements.

I claim—

1. In a type-writer, the combination with a paper-roll, of a series of key-levers arranged parallel to each other and at right angles to the paper-roll, each of said key-levers having a rigid depending arm, an endwise-shiftable printing-plate and a way therefor arranged parallel to the printing-roll and a pivoted bell-crank lever interposed between the key-levers and the printing-plate and adapted to be engaged by the depending arm of the key-lever when the latter is actuated and having an upturned end adapted to engage the printing-plate whereby to shift the latter into printing position, substantially as described.

2. In a type-writer, the combination with a sliding printing-plate having type characters thereon, a stop-pin carried by the printing-plate, a pivoted bell-crank lever having an upturned end operatively engaging the printing-plate, a series of pivoted key-levers having rigid depending arms operatively engaging the bell-crank and said key-levers serving when depressed to rock the bell-crank on its lever and thereby shift the printing-plate and the inner end of said key-lever, when actuated serving also to engage a stop-pin whereby to arrest the movement of the printing-plate, substantially as described.

3. In a type-writer, the combination with a printing-plate having three rows of type characters thereon, ways in which said printing-plate slides both vertically and horizontally, pivoted key-levers and pivoted bell-crank levers whereby said printing-plate may be shifted laterally in either direction, a rigid stop carried by the printing-plate and adapted to engage the inner end of the actuated key-lever, and two key-levers independent of the bell-crank and of each other but connected to the printing-plate and adapted to move the same vertically whereby to bring the desired line of type characters into printing position, substantially as described.

4. In a type-writer, the combination with a paper-carriage and printing mechanism, of an ink-ribbon, spools mounted at opposite sides of the machine and to which the ends of the ribbon are secured, a rocking support for said spools and gearing mounted upon said support and adapted to be frictionally driven by the paper-carriage, substantially as described.

5. In a type-writer, the combination with an endwise-movable printing-plate, of a series of key-levers, bell-crank levers pivoted upon the base of the machine and having their ends turned toward each other, arms on the key-levers adapted to engage said inwardly-turned ends and the opposite ends of said bell-cranks being adapted to engage the printing-plate when actuated, and springs for returning the bell-cranks to their normal position, substantially as described.

6. In a type-writer, the combination with a sliding printing-plate, of a series of key-levers, connections between the printing-plate and the key-levers, a sliding paper-carriage, a spring for moving the carriage in one direction, a pawl-and-ratchet mechanism for arresting the movements of the paper-carriage, connections between the key-levers and the ratchet mechanism, a spring-actuated hammer and a latch mechanism, one member of which is carried by the hammer and the other by the ratchet-actuating mechanism whereby upon a single actuation of the key-lever the carriage is permitted to feed and the hammer is released, substantially as described.

7. In a type-writer, the combination with a paper-roll and a handpiece or head for revolving it, said roll being provided with two concentric rows of apertures and a pivoted spring-stop adapted to enter the apertures of either row, substantially as and for the purpose described.

8. In a type-writer, the combination with a paper-roll and means for rotating it, of a paper-guard having a vertical portion in juxtaposition to the roll, a slotted base portion whereby it may be adjusted to and from the face of the roll and a curved rear portion adapted to support the paper as it is fed from the paper-roll into the curved portion of said guard, substantially as described.

WILLIAM P. QUENTELL.

Witnesses:
F. J. DIKES,
W. E. MILLER.